June 1, 1943.　　O. W. GITHENS ET AL　　2,320,423
CAMERA
Filed June 5, 1940　　3 Sheets-Sheet 1
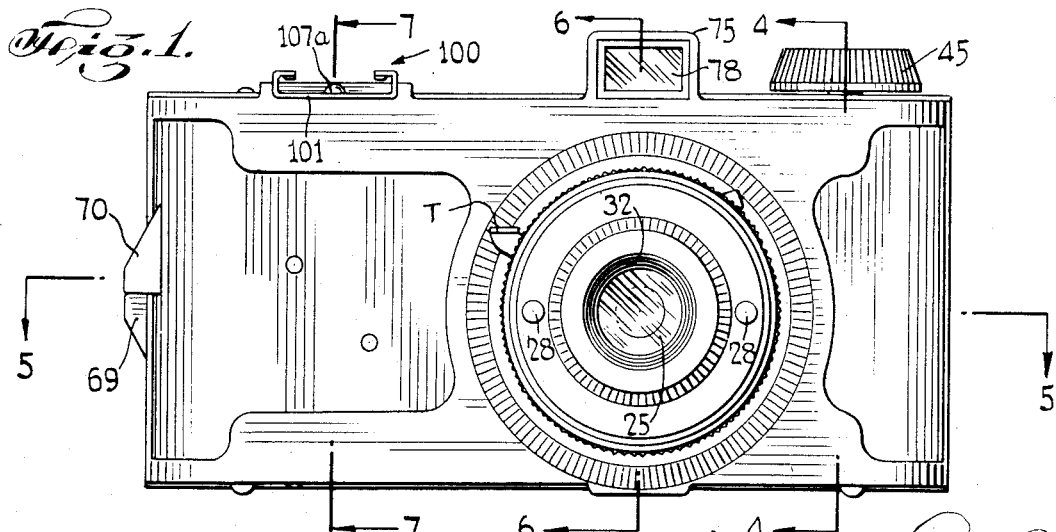
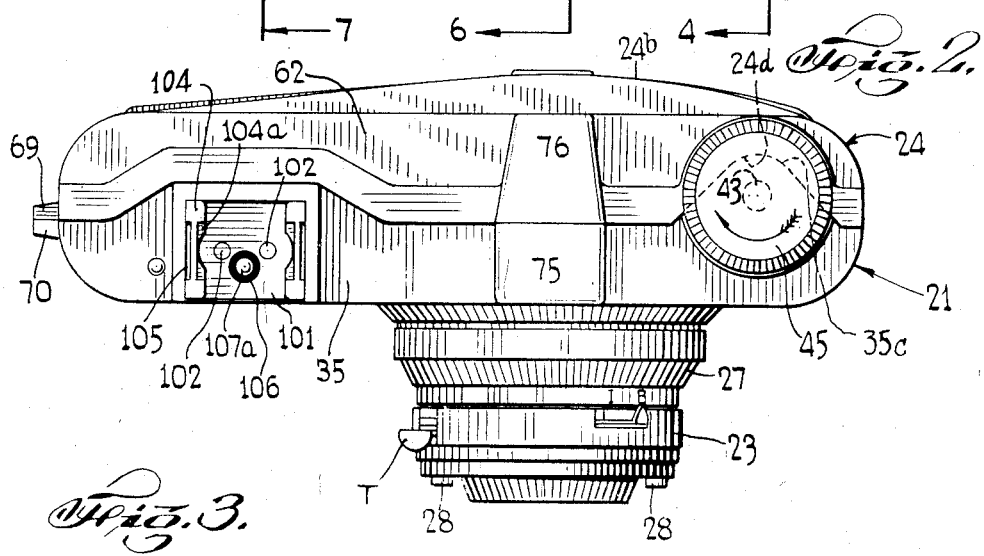
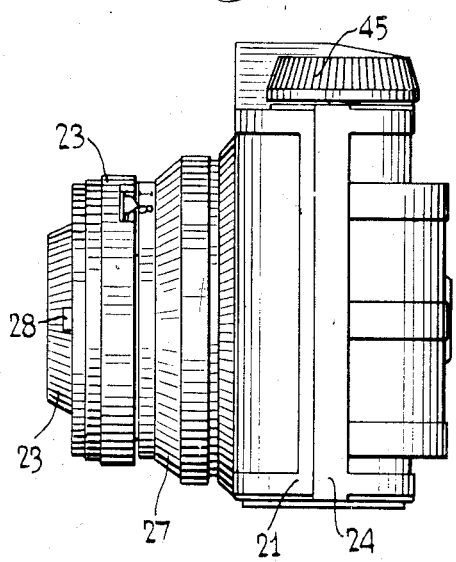
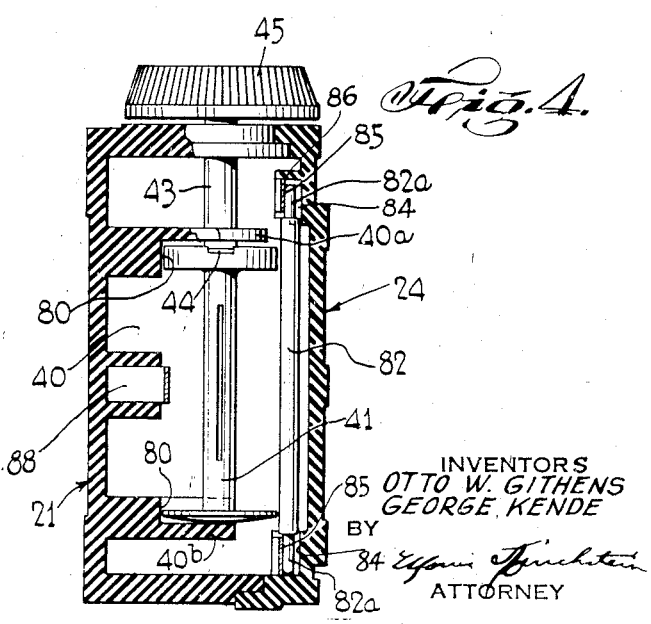
INVENTORS
OTTO W. GITHENS
GEORGE KENDE
BY
ATTORNEY

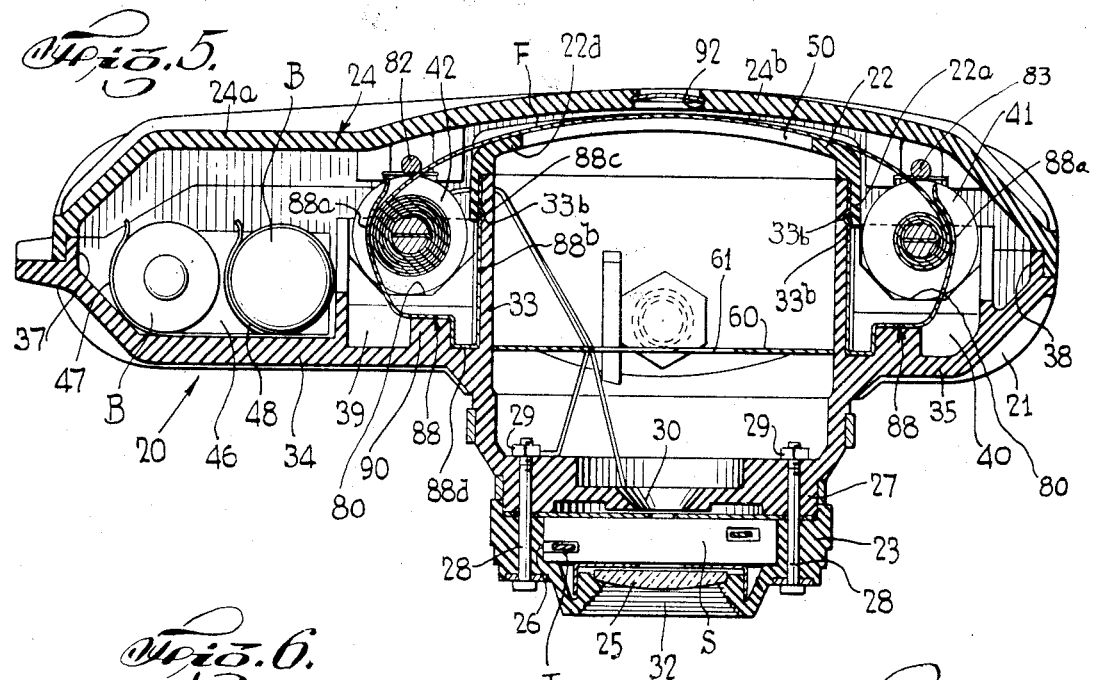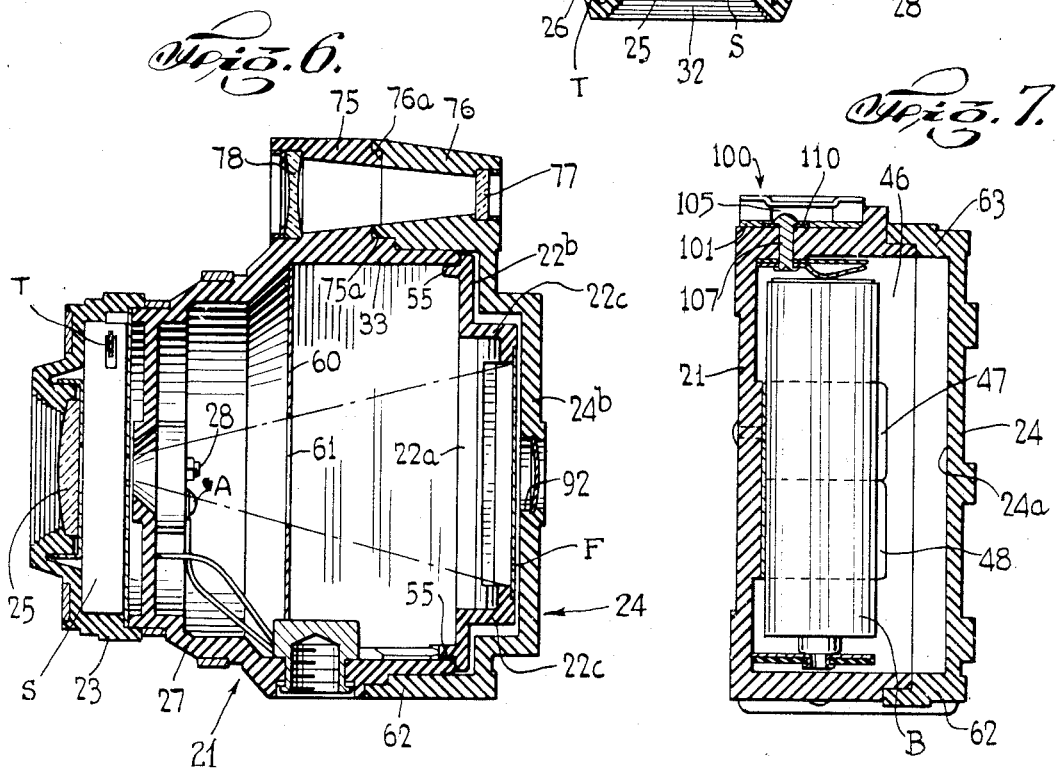

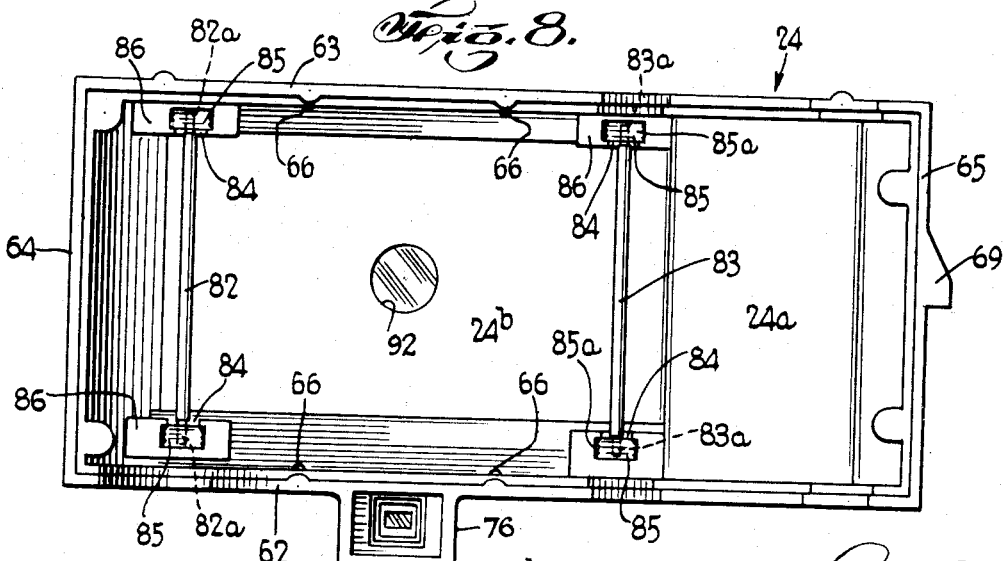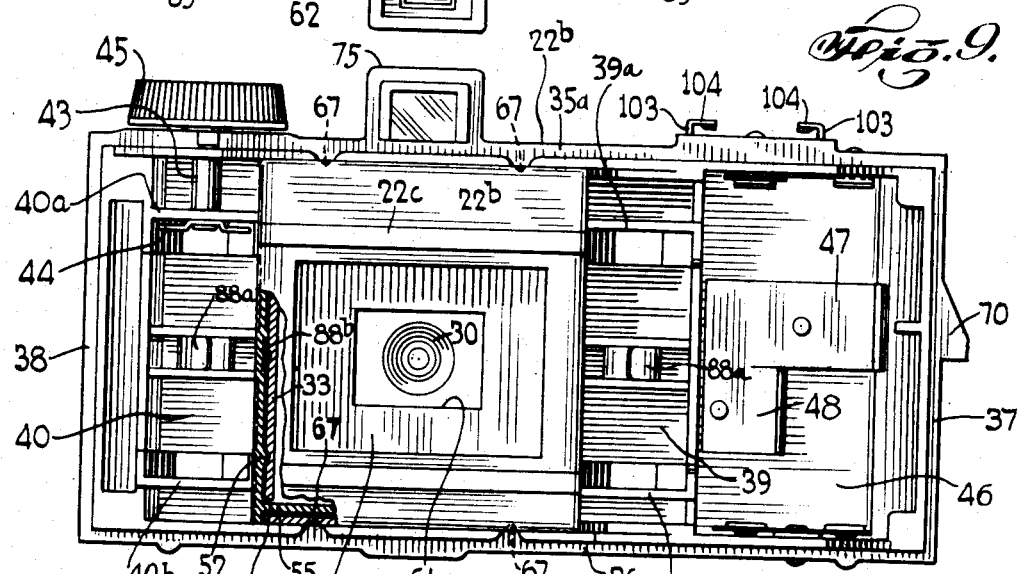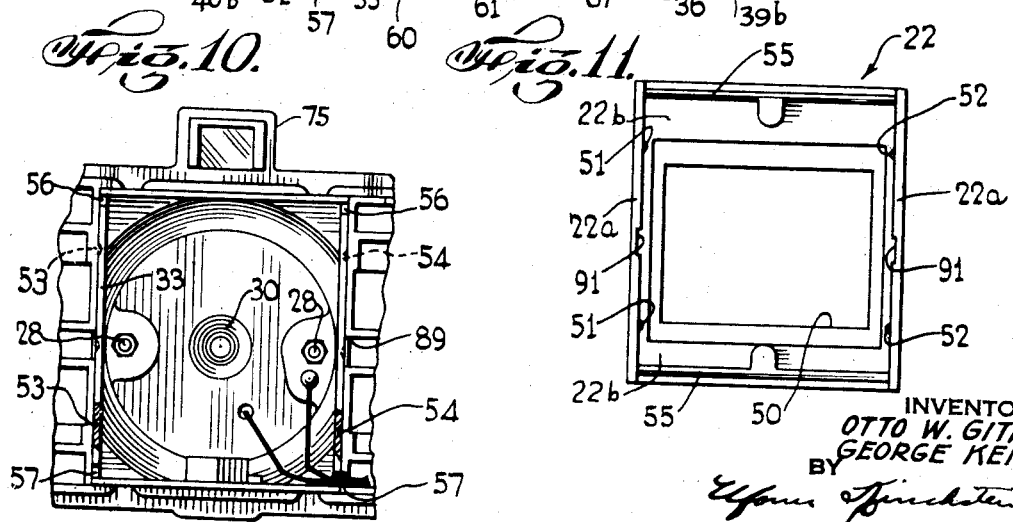

Patented June 1, 1943

2,320,423

UNITED STATES PATENT OFFICE 2,320,423

CAMERA

Otto W. Githens and George Kende, New York, N. Y., assignors to Universal Camera Corporation, New York, N. Y., a corporation of Delaware Application June 5, 1940, Serial No. 338,899

4 Claims. (Cl. 95—31)

This invention relates generally to cameras. More particularly, this invention relates to improved constructional features of a camera having a casing made of Bakelite or similar material.

One of the objects of this invention is to provide a camera of the character described having a novel and improved film track construction whereby the pressure pad may be eliminated.

Another object of this invention is to provide in a camera of the character described improved mounting means for the film spools which shall prevent them from binding and which shall at the same time decrease the amount of effort needed to transfer the film from the take-off to the take-up spool.

Another object of this invention is to provide a camera of the character described having a casing consisting of a plurality of assembled parts in which there is provided an improved two-part view finder.

Still another object of the invention is to provide a camera of the character described in which the casing thereof shall comprise a plurality of molded parts so constructed and arranged as to be readily and economically assembled into a unit.

A further object of this invention is to provide in combination with a camera of the character described, an improved construction for an accessory clip adapted to support a flash unit or other similar camera accessory.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of a camera constructed in accordance with this invention;

Fig. 2 is a top plan view thereof;

Fig. 3 is an end elevational view thereof as viewed from the right hand end of Fig. 2;

Fig. 4 is an enlarged cross-sectional view taken substantially on the line 4—4 of Fig. 1;

Fig. 5 is an enlarged cross-sectional view taken substantially on the line 5—5 of Fig. 1;

Fig. 6 is an enlarged cross-sectional view taken substantially on the line 6—6 of Fig. 1;

Fig. 7 is an enlarged cross-sectional view taken substantially on the line 7—7 of Fig. 1;

Fig. 8 is a bottom plan view of one of the casing parts disassembled from the camera shown in Figs. 1 to 3 and disclosing the interior construction thereof;

Fig. 9 is a bottom plan view, partly sectional, of another casing part disassembled from the camera shown in Figs. 1 to 3 and disclosing the interior construction thereof;

Fig. 10 is a view of a portion of the casing part shown in Fig. 9 but of slightly smaller size and with a portion thereof removed to reveal the interior construction; and Fig. 11 is a bottom plan view of one of the members disassembled from the casing part shown in Fig. 9.

Referring now in detail to the drawings, there is disclosed a photographic camera constructed in accordance with this invention and generally comprising four essential parts, each of which is of molded Bakelite construction or of other similar moldable material. The said four essential parts comprise a main body 21, a film track member 22, a shutter and lens housing 23 and a back cover 24. The film track member 22, the shutter and lens housing 23 and the cover 24 are adapted to be attached to the main body 21 to form a complete camera casing, housing the necessary camera operating devices.

The shutter and lens housing 23 is provided with a suitable objective lens 25 and a chamber 26 into which there is mounted a suitable shutter device, which may be contained in the shutter housing S and may be of the type fully disclosed and described in the co-pending application Ser. No. 315,291, filed Jan. 24, 1940, for Camera shutters. The shutter and lens housing is fixedly attached to a portion 27 projecting forwardly of the main body 21. The attaching means may comprise a pair of bolts 28 passing through the said housing 23 and portion 27 and held in place by the nuts 29. The said portion 27 of the main body 21 is provided with an aperture 30 in optical alignment with a shutter aperture, the lens 25 and an aperture 32 in the housing 23 within which the lens is mounted. The usual type of operating tab T extending through an opening in the housing 23 is provided for actuating the shutter.

Integral with the forwardly projecting portion 27 and extending inwardly of the main body 21 and of the cover 24 is a box-like portion substantially rectangular in cross-sectional contour and comprising the walls 33. Integral with the said walls 33 of the box-like portion and with the portion 27 are longitudinally extending wall portions 34 and 35 forming the bottom wall of the main body 21, (see Fig. 5). Integral with the bottom walls 34 and 35 are upstanding surrounding side walls 35a and 36 and end walls 37 and 38, (see Figs. 5 and 9).

Spaced from each other in a longitudinal direction with respect to the main body 21 and adjacent opposite sides of the walls 33 are film spool chambers 39 and 40, formed by the said walls 33 and the bottom walls 34 and 35. The chamber 40 is adapted to house the take-up spool 41 while the chamber 39 is adapted to house the take-off spool 42. A shaft 43, (see Fig. 9), journalled in the wall 35a and in a wall 40a of the film chamber 40, carrying a cam member 44, is adapted to cause rotational movement of the spool 41 to advance the film after an exposure. A knob 45 is attached to the shaft 43 to facilitate the manual rotation of the spool 41 to advance the film. Any suitable type of film spools 41 and 42 may be employed such as, for example, that shown in the patent to O. W. Githens, No. 2,029,474, dated February 4, 1936, for Photographic camera.

The space between the film chamber 39 and the wall 37 of the main body 21, (see Figs. 5 and 9), is adapted to serve as a battery housing chamber 46 into which there is mounted a pair of batteries B which are held in position by the spring clips 47 and 48, the said batteries being adapted to serve as a source of energy in operating a suitable photo-flash device which may be used in connection with the camera. One such arrangement of photo-flash device together with the electrical connections from the batteries B thereto and which device is designed to be operated in synchronism with the operation of the shutter, is fully disclosed and described in the co-pending application Ser. No. 327,122, filed April 1, 1940, for Camera.

The film track member 22 is designed to form a film passageway for the movement of the film as it is unwound from the spool 42 and wound on the spool 41. The said member 22 is molded as a unit and comprises a rectangular shaped box-like member having a pair of oppositely disposed downwardly depending walls 22a and a top wall 22b, (see Figs. 5, 6 and 9 to 11). Projecting above the top wall 22b are a pair of spaced parallel walls 22c at right angles to the depending walls 22a and interconnected by a curved wall 22d therebetween. The said curved wall 22d is provided with a film aperture 50 which is of a size equal to the size of the exposure desired and which is adapted, when the member 22 is properly assembled, to be in optical alignment with the previously described apertures 30 and 32. The wall 22d between the walls 22c is slightly recessed as shown in Figs. 5 and 6 to provide a film track and to prevent lateral disalignment of the film F during its movement. By providing a curved film track, as above described, the optical definition in the corners of the picture will be increased. Another advantage in the use of a curved film track designed in accordance with this invention is that it obviates the necessity of employing a pressure pad, since the film tension, in passing from one spool to the other, tends to keep the film relatively flat against the track. The film track member 22 is so designed that the depending walls 22a will frictionally overlie the outer surfaces of a pair of corresponding walls 33 of the box-like portion, as clearly shown in Fig. 5 of the drawings. To aid in retaining the member 22 in such frictional engagement, there is provided a pair of projections 51 on the inner surface of one depending wall 22a, (see Fig. 11), and a second pair of projections 52 on the inner surface of the other depending wall 22a. These pairs of projections 51 and 52 are adapted to be resiliently received in correspondingly positioned pairs of detents 53 and 54 in the outer wall surface of the box-like member 33, (see Fig 5). To further assist in properly aligning the member 22 with respect to the walls 33 of the box-like member, there is provided a pair of ridges 55 on the under surface of the wall 22b which are adapted to be received in pairs of aligned notches 56 and 57 adjacent the top edge of the box-like member 33, (see Figs. 6 and 9 to 11).

It is noted that the portions of the wall 22b of the member 22 hide from view a part of the interior mechanism within the box-like member, thereby adding to the appearance of the camera when the back cover 24 is removed for loading.

A mask member 60 (see Figs. 5, 6 and 9) having an aperture 61 in optical alignment with the apertures 50, 30, and 32 is disposed within the box-like member formed by the wall 33 to prevent undesired diffusion of the light entering through the lens 25. This mask 60 further serves to hide the electric connections for the hereinbefore mentioned synchronizing device contained within the box-like member.

There is thus provided a molded camera part in the form of a film track member which may be readily assembled by merely snapping the same into position.

The back cover 24 comprises a bottom wall 24a provided with an integral curved portion 24b, said curved portion being disposed so as to overlie and be slightly spaced from the curved wall 22d of the film track member 22 to conform to and accommodate the film passageway. Integral with the bottom walls 24a and 24b are a pair of side walls 62 and 63 and end walls 64 and 65, (see Fig. 8). The edges of the walls 62 to 65 of the cover 24 are designed to be in interlocking mating arrangement with the walls 35a to 38 of the main body 21. This interlocking arrangement forms a light seal in the manner well known in the art and as clearly shown in Figs. 5 to 7 of the drawings. The back cover 24 is adapted to be resiliently attached to the main body 21 by means of projections 66 on the inner surfaces of the side walls 62 and 63 (see Fig. 8) which are adapted to be received in correspondingly positioned detents 67 in the walls 33 of the box-like portion, (see Fig. 9). The cover 24 is provided with a notched portion 24d in the side wall 62 to accommodate a corresponding projecting portion 35c of the wall 35a on the main body part, (see Fig. 2). A lug projection 69 on the back cover 24 integral with and extending outwardly from the end wall 65, and adjacently disposed with respect to a similar member 70 on the end wall 37 of the main body 21, is provided to facilitate the ready disassembly of the cover 24 from the main body 21 for loading or unloading the camera or for any other desired reasons.

In accordance with this invention, there is provided a novel construction for view finder in which the wall 35 of the main body 21 carries one part 75 of a view finder, the said part being integrally molded with the wall 35a while the back cover 24 carries a cooperating view finder part 76 which is integrally molded with the wall 62 thereof. A suitable lens 77 is supported in the view finder part 76 while another lens 78 is supported in the part 75, (see Fig. 6). By the above described construction it is seen that the cover 24 may be removed from the main part 21 without disturbing the ultimate relative position between the lenses 77 and 78. The inner edge 76a of the part 76 and the adjacently disposed inner edge 75a of the part 75 are arranged in interlocking relationship so that when the cover 24 is mounted on the main body 21, the interlocking edges 75a and 76a will form a light seal for the view finder. By providing the view finder in a two-part construction, as above described, the molding operation is thereby simplified and in addition, adds greater strength to the molded parts. Also, it is noted that by such view finder construction, the height at which the view finder must be positioned is greatly reduced.

As hereinbefore described, the film spools 41 and 42 are of the type which are so mounted as to have their flanges rest lightly upon shoulder portions 80 in and between the pairs of walls 40a, 40b, and 39a, 39b of the spool chambers 40 and 39, respectively, (see Figs. 4 and 5). To prevent the spools 41 and 42 from binding and to insure the free rotational movement of the said spools, there is provided the following construction. A pair of longitudinal rollers 82 and 83 are provided with reduced end portions 82a and 83a, respectively, which are freely received in open bearings 84 formed on the inner surface of the wall 24b of the cover 24. The rollers 82 and 83 are maintained in freely rotatable position by spring steel retainer members 85 which are provided with saw teeth holding edges 85a which bite into the material of the bearing cradles 86. It is noted that by means of the short bearing surface providing in the cradles 86 in combination with the reduced diameter portions 82a and 83a of the shafts 82 and 83, any binding which may be caused by a misalignment of the rollers or of the bearing cradles will be compensated for.

It is thus noted from the above described construction that whenever the knob 45 is turned to cause advancement of the film F, the rims of the flanges of the spools 41 and 42 will engage the rollers 82 and 83 to provide a uniform roller bearing for the spools and thereby prevent binding.

In order to retain the film on the spools under tension, there is provided a pair of substantially U-shaped spring members 88. One leg 88a of each of the spring members 88 is adapted to be curved, as shown, to resiliently overlie the uppermost convolution of the rolled film while the other leg 88b is adapted to lie adjacent the outer surface of a wall 33 of the box-like member. The spring members 88 are firmly held in position by means of the film track member 22 by having the depending portions 22a of the said member 22 frictionally overlying a portion of the legs 88b. In other words, the film track member 22 is so constructed as to resiliently snap into position while at the same time gripping the legs 88b between the inner surface of the said member 22 and the outer surface of the adjacent walls 33 of the box-like portion. To facilitate the proper positioning of the spring members 88, there is provided a pressed out projection 88c on the leg 88b which is adapted to be resiliently received in a corresponding detent 33b in the outer surface of the walls 33. To prevent lateral displacement of the spring members 88, the outer surface of the walls of the box-like portion 33 are provided with a pair of notches 89 designed to snugly receive the legs 88 therein, (see Fig. 10). A portion of each of the spring members 88 is adapted to rest upon a raised lug 90 integrally molded with the bottom wall 34 of the main body 21 and another portion 88d of the spring 88 is adapted to be angularly bent to fit into a recessed portion adjacent the lug 90. The depending walls 22a of the film track member 22 are provided with a pair of notches 91 (see Fig. 11) designed to accommodate therein portions of the legs 88b adjacent the upper edges thereof.

It is noted that, by the above described construction, the spring members 88 are readily assembled with the assembly of the film track member 22 without the necessity of employing additional fastening means.

The back cover 24 is provided with a window opening 92 which is covered by a colored transparent member and is adapted to serve as a viewing aperture to be aligned with a corresponding number on the film to indicate the number of exposures taken.

In accordance with this invention, we have also provided an improved construction for an accessory clip adapted particularly for use in connection with a photo-flash unit designed to cooperate with the batteries B and to synchronize with the operation of the shutter mechanism as fully disclosed and described in the said co-pending application Ser. No. 327,122, filed April 1, 1940. As shown in Figs. 1, 2, 7 and 9, the clip 100 comprises a bottom wall 101, which is rigidly attached to the wall 35a of the main body 21 by any suitable means such as rivets 102, a pair of parallel walls 103 at the opposite sides of and at right angles to the wall 101 and a pair of inwardly extending flanges 104 parallel to the bottom wall 101. The flanges 104 are spaced from the bottom wall 101 a sufficient distance to permit the insertion therebetween of a corresponding attachment member carried by the accessory to be mounted therein. The side walls 103 are provided with notches 105 and a portion of each of the flanges 104 is depressed at 104a to impart additional resilience to the clip to thereby accommodate slight difference in thickness of the said cooperating member on the accessory. The bottom wall 101 is further provided with an aperture 106 through which there projects the head 107a of the contacting rivet 107 which is adapted to form an electrical contact with the batteries B by means of suitable contact members. A circuit is formed between the batteries and the flash unit, and an insulating washer 110 is provided between the rivet 107 and the bottom wall 101 to insulate the rivet 107 from the clip 100.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

What we claim is:

1. In a camera of the character described, the combination of a main body, a back cover detachably secured thereto to form a camera casing, a film track member carried by said main body, said camera casing having a spool chamber on one side of said film track member, open bearings supported on said main body and disposed in said spool chamber, said bearings being adapted to freely receive a film spool, a roller carried by said back cover, said roller being so constructed and arranged as to maintain said spool in said open bearings, and a spring member mounted on said main body and disposed in said spool chamber for maintaining the rolled film on said spool under tension.

2. A combination as set forth in claim 1 wherein said roller is mounted for shifting normal to its axis of rotation.

3. In a camera of the character described, the combination of a main body, a back cover detachably secured thereto to form a camera casing, said main body having a box-like portion extending inwardly of said casing, a film track member, said film track member having depending flanges telescopically and frictionally received on said box-like portion, open bearings carried by said main body and disposed in spool chambers on opposite sides of said box-like portion, shafts rotatably mounted on said back cover and adapted to co-operate with said open bearings to maintain film spools in said spool chambers, and spring members in said spool chambers for maintaining the rolled film on the spools under tension, a portion of each of said spring members being held between a flange of said film track member and an adjacent wall of said box-like portion.

4. In a camera of the character described, the combination of a main body, a back cover detachably secured thereto to form a camera casing, a film track member carried by said main body, said camera casing having spool chambers on oppositely disposed sides of said film track member in which flange-ended film spools are adapted to be received, open bearings supported on said main body and disposed in said spool chambers, said bearings being so constructed and arranged as to freely receive the flanges of said spools, and means carried by said back cover for co-operating with the flanges on said spools to maintain said flanges in said open bearings, said last named means comprising a pair of shafts rotatably mounted on said back cover and shiftable towards and away from said bearings.

OTTO W. GITHENS.
GEORGE KENDE.